Figure 1:
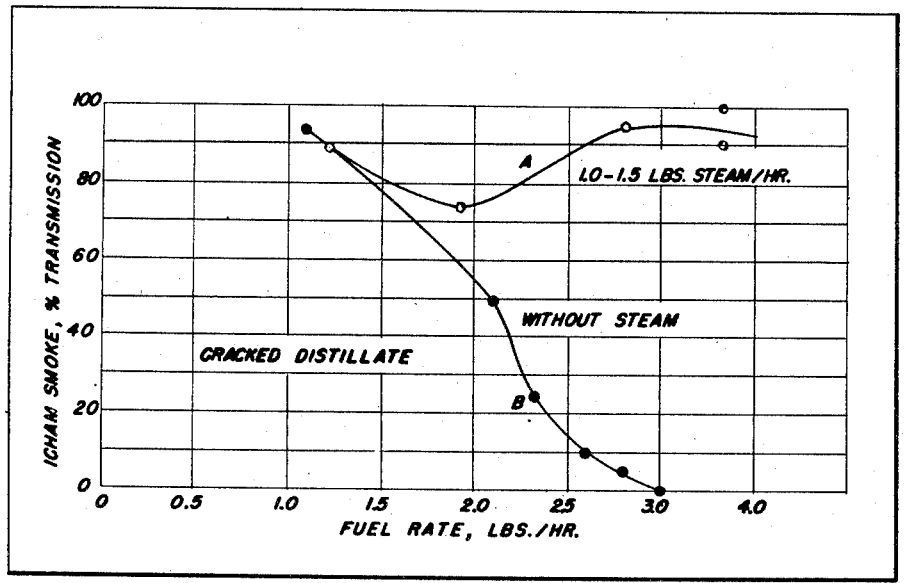

Jan. 2, 1951     H. R. LINDEN     2,536,379
HUMIDITY CONTROL IN POT TYPE VAPORIZING BURNERS
Filed April 8, 1948     5 Sheets-Sheet 1

INVENTOR.
HENRY R. LINDEN
BY
AGENT OR ATTORNEY

Jan. 2, 1951        H. R. LINDEN        2,536,379
HUMIDITY CONTROL IN POT TYPE VAPORIZING BURNERS
Filed April 8, 1948        5 Sheets-Sheet 5

INVENTOR.
HENRY R. LINDEN
BY Francis F. Johnston
AGENT OR ATTORNEY

Patented Jan. 2, 1951

2,536,379

UNITED STATES PATENT OFFICE 2,536,379

HUMIDITY CONTROL IN POT TYPE VAPORIZING BURNERS

Henry R. Linden, Franklin Park, Ill., assignor to Socony-Vacuum Oil Company, Incorporated, a corporation of New York Application April 8, 1948, Serial No. 19,747

5 Claims. (Cl. 158—92)

1

The present invention relates to pot type vaporizing burners and, more particularly, to the operation of pot type vaporizing burners under controlled conditions of humidity and to means for controlling the water vapor content of the vaporized fuel.

It has been recognized for several years that the pot type vaporizing burners which were designed and established at a time when 100 per cent paraffinic fuel was widely available do not operate as satisfactorily when fueled with burning oil containing more than about 10 per cent of cracked fuel. The pot type vaporizing burners which have not been modified in some manner to adapt the burner to the fuels now most widely available, i. e., fuels containing a large proportion of catalytically cracked fuel, have a tendency to produce flue gases containing more smoke than the minimum considered to be desirable. A study of this problem has led to the conclusion that of the many variables affecting combustion in the pot type vaporizing burner the most important is the water vapor content of the air supply.

Before discussing the operation of pot type vaporizing burners with controlled humidity and a means for controlling the humidity of the air for combustion, it is desirable to define certain terms used herein. Absolute humidity is the weight ratio of water vapor to dry air and equivalent absolute humidity is the weight ratio of the water vapor introduced into the burner plus the water vapor already present in the air to the weight of air entering the burner. The water vapor-fuel ratio is the ratio of the weight of the atmospheric water vapor plus the weight of the water vapor introduced into the burner to the weight of the fuel entering the burner. The carbon-hydrogen ratio of the fuel is the weight ratio of carbon to hydrogen in the fuel. Icham smoke is the percentage of light transmission of a glass rod after having been placed for twenty minutes in the path of the flue gases in the stack. Therefore 100 per cent Icham represents a smoke-free condition and 0 per cent Icham represents a heavy smoke condition; 10 per cent Icham is considered acceptable for pot type vaporizing burners.

An appreciation of the effect of variations in the water vapor content of air supporting combustion in pot type vaporizing burners can be gained from a review of the variation of absolute humidity of air under normal winter conditions and under summer conditions. For example, at 50 per cent saturation at 35 degrees Fahrenheit,

2 i. e., a normal winter condition the ratio of water vapor to dry air is 0.0025 pound per pound of dry air. On the other hand, at 90 per cent saturation at 95 degrees Fahrenheit, the ratio is 0.0230 pound of water vapor per pound of dry air. Assuming an average of 20 pounds of air per pound of fuel, the foregoing values represent a variation between 0.05 and 0.46 pound of water vapor per pound of fuel or a variation of about 900 per cent.

Figure 5:
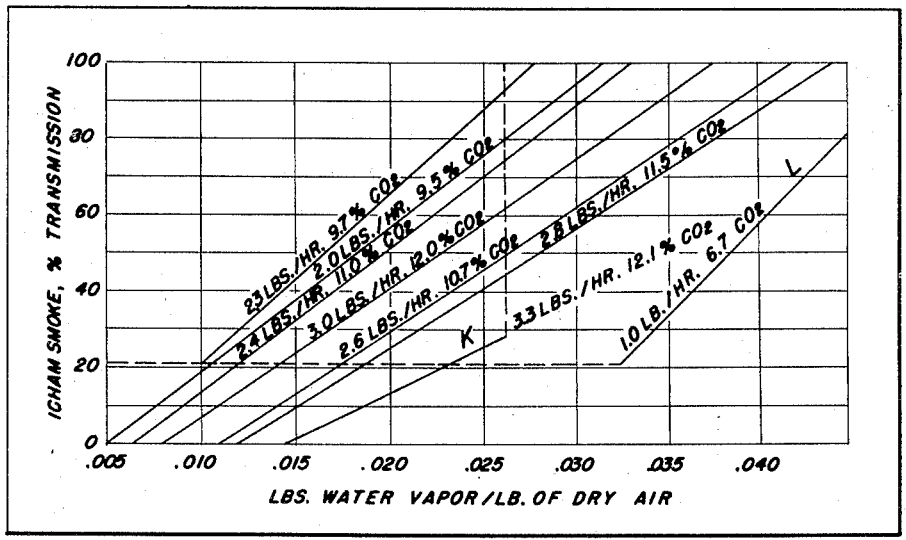
Figure 6:
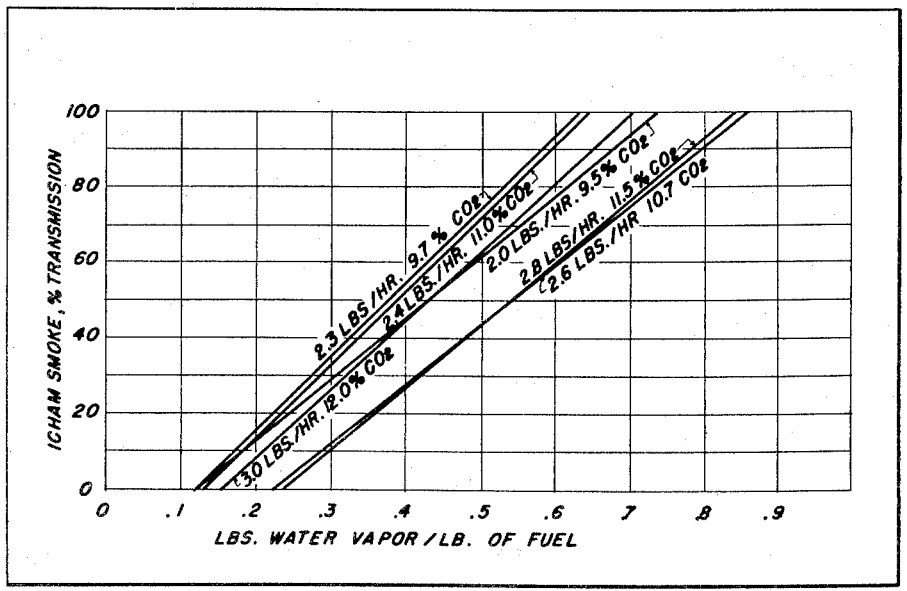
Figure 7:
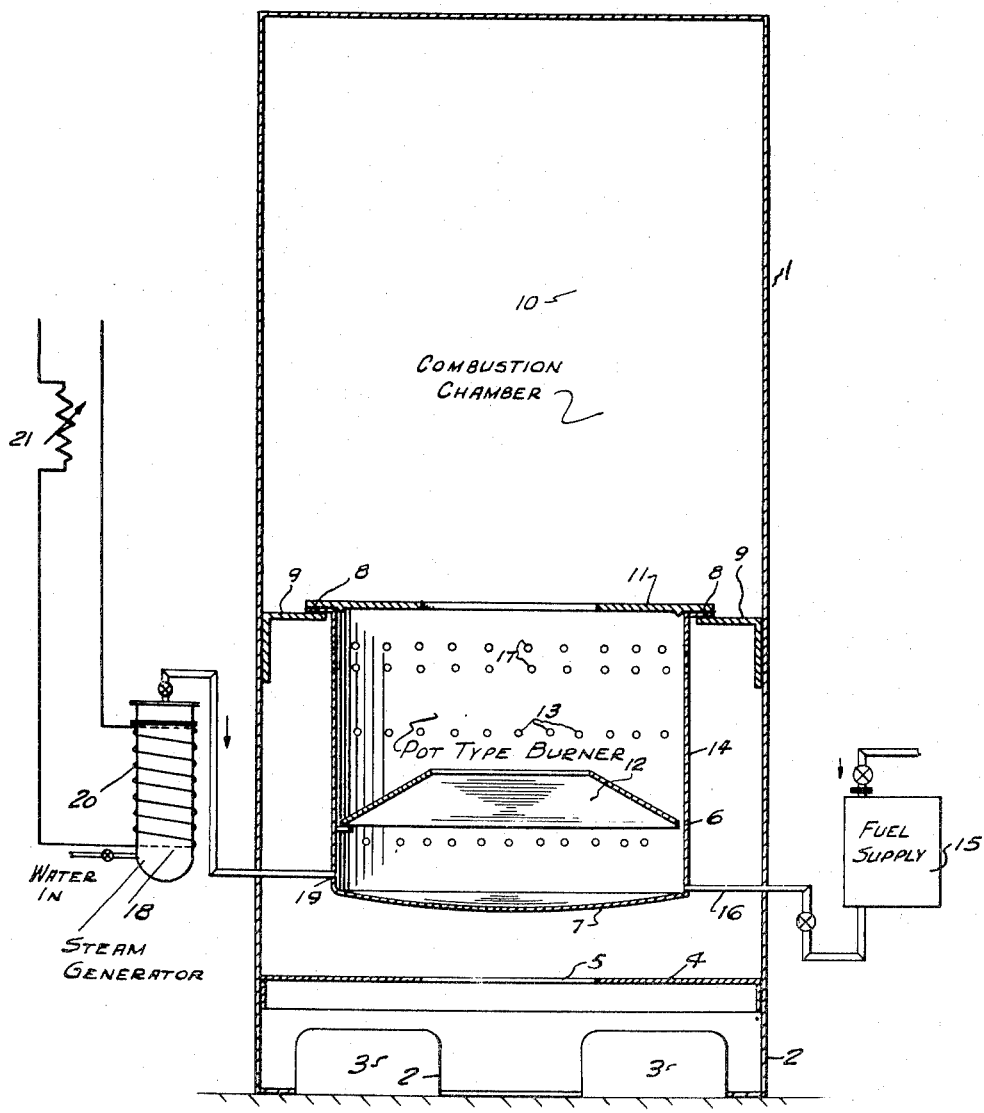
Figure 8:
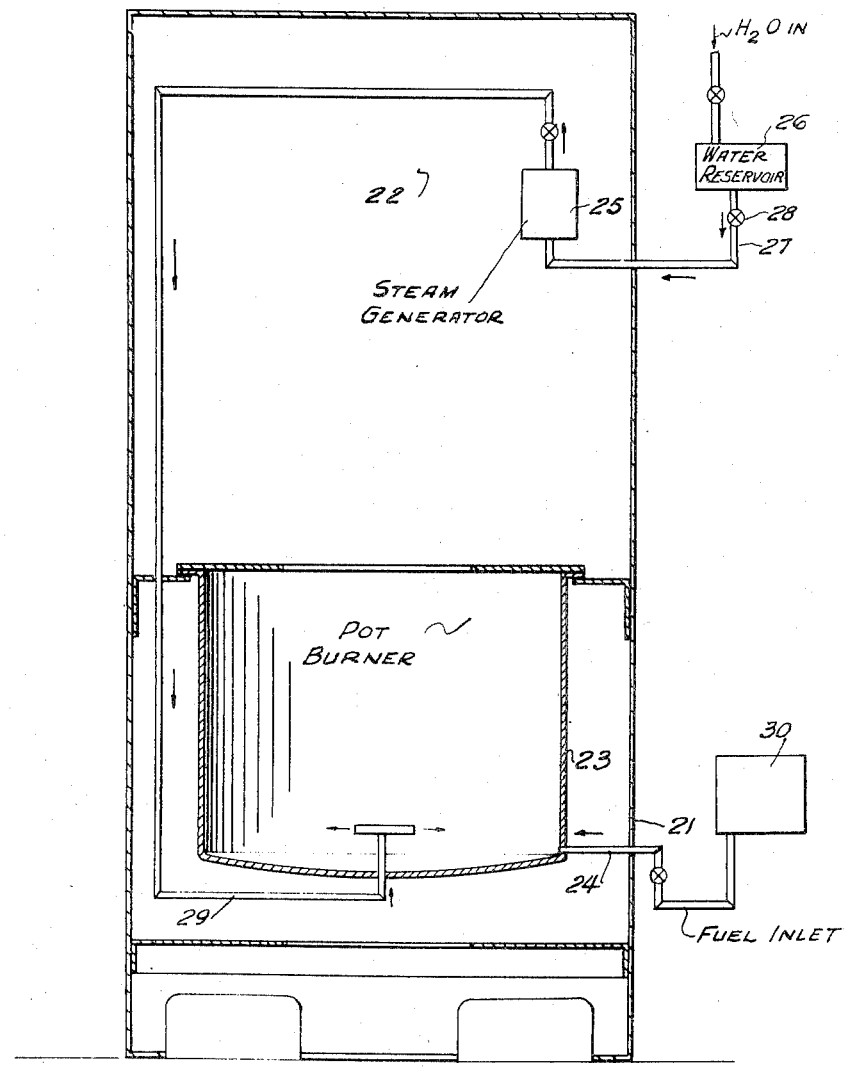

It is an object of the present invention to provide a means for controlling the water vapor content of the fuel vapors in pot type vaporizing burners. It is another object of the present invention to provide a method of operating pot type vaporizing burners whereby regulation of the water vapor content of the vapors of fuel regulates the amount of smoke produced. It is a further object of the present invention to provide means for introducing water vapor into the fuel vapors in a pot type vaporizing burner. Other objects and advantages will become apparent to those skilled in the art from the following description taken in conjunction with the drawings in which:

Figure 1 is a graph showing the effect upon the amount of smoke produced when burning 100 per cent cracked distillate with and without the control of the amount of water vapor present in the fuel vapors, Figures 2, 3, 4, 5 and 6 are graphs illustrating the effect of the water content of the air used in burning the fuel at various rates of fuel consumption, and Figure 7 and 8 are illustrations of apparatus suitable for burning hydrocarbons with air having a controlled water vapor content.

In general, the burning of mixtures of hydrocarbons, such as kerosene and fuel oil containing more than 10 per cent of oil from a cracking operation, in an unmodified pot type vaporizing burner is attended by the production of an undesirable amount of smoke particularly when the burner is operating at or close to the peak output. This is graphically illustrated by the curves presented in Figure 1.

In Figure 1, curve B represents the relation between per cent transmission in an Icham smoke test and the rate of fuel consumption in the absence of added water vapor, and curve A represents the same relation when 1.0 to 1.5 pounds of water vapor per hour are injected into the fuel vapors. These curves have been plotted from data obtained in the operation of a commercial pot type vaporizing burner using recommended drafts ranging from 0.04 inch of water at a fuel rate of one pound per hour to 0.08 inch of water at fuel rates of 3 to 3.5 pounds per hour. While in the lower operating range, i. e., 0.5 to 2.0 pounds of fuel per hour the injection of water vapor into the fuel vapors causes the flame to move into the bottom of the pot and thereby increase the amount of smoke, this condition can be overcome by decreasing the draft. For example, at a fuel rate of 1.9 pounds per hour and at a rate of 1 to 1.5 pounds of water vapor per hour the per cent transmission is raised from 74 per cent to 96 per cent transmission by lowering the stack draft from 0.055 to 0.035 inch of water. Similar improvement in per cent transmission or reduction in smoke can be obtained at lower fuel rates.

As can be understood readily the curves A and B establish that in a pot type vaporizing burner commercially available burning cracked distillate at the rate of 2 to 3.5 pounds per hour the introduction of 1 to 1.5 pounds of water vapor per hour into the fuel vapors raises the per cent transmission from 55 per cent and zero transmission respectively to 75 per cent to 95 per cent respectively. In other words, the light transmission in the Icham smoke test was increased by more than 36 per cent.

Figure 2:
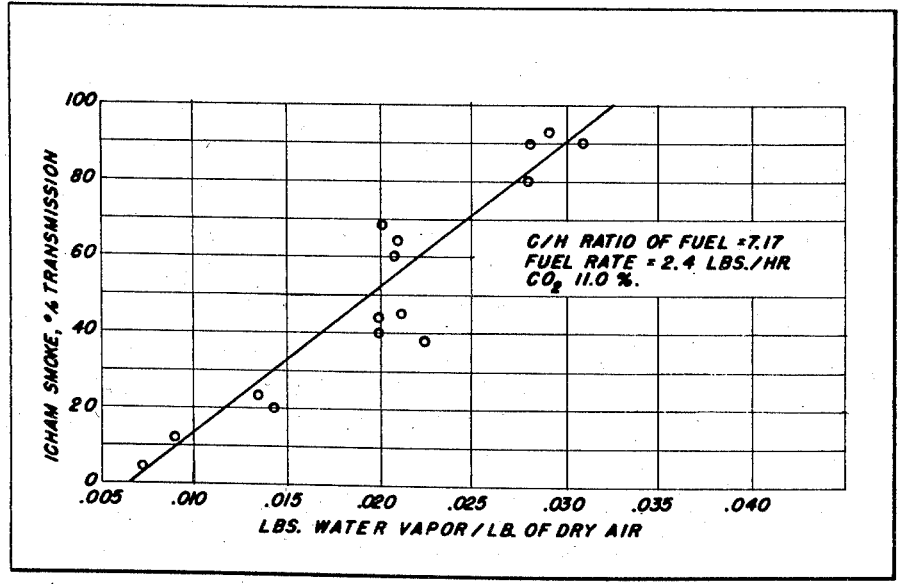
Figure 3:
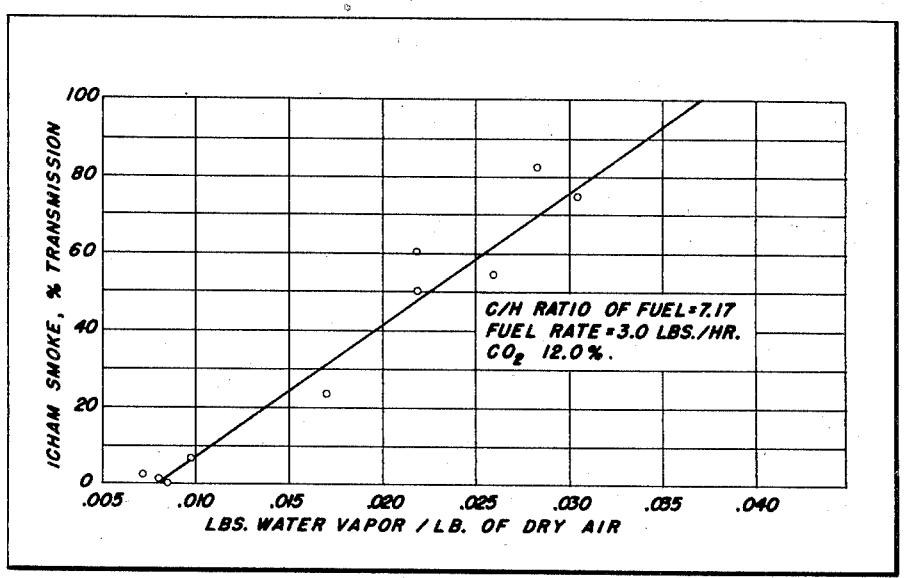

The curve given in Figure 2 establishes that at a constant rate of 2.4 pounds per hour a fuel having a carbon to hydrogen ratio of 7.17 can be burned to a flue gas containing 11.0 per cent carbon dioxide with an Icham smoke transmission of 60 to 100 per cent provided about 0.022 to about 0.033 pound of water vapor per pound of dry air or about 0.446 to about 0.669 pound of water vapor is present in the combustible vapors.

When using a fuel of the same carbon to hydrogen ratio, i. e., 7.17 and burning it to a flue gas containing 12.0 per cent carbon dioxide at the rate of 3.0 pounds of fuel per hour, an Icham smoke transmission of 60 to 100 per cent can be obtained provided about 0.025 to about 0.037 pound of water vapor per pound of dry air or about 0.467 to about 0.69 pound of water vapor per pound of fuel is present in the combustible vapors. This is established by the curve of Figure 3.

Figure 4:
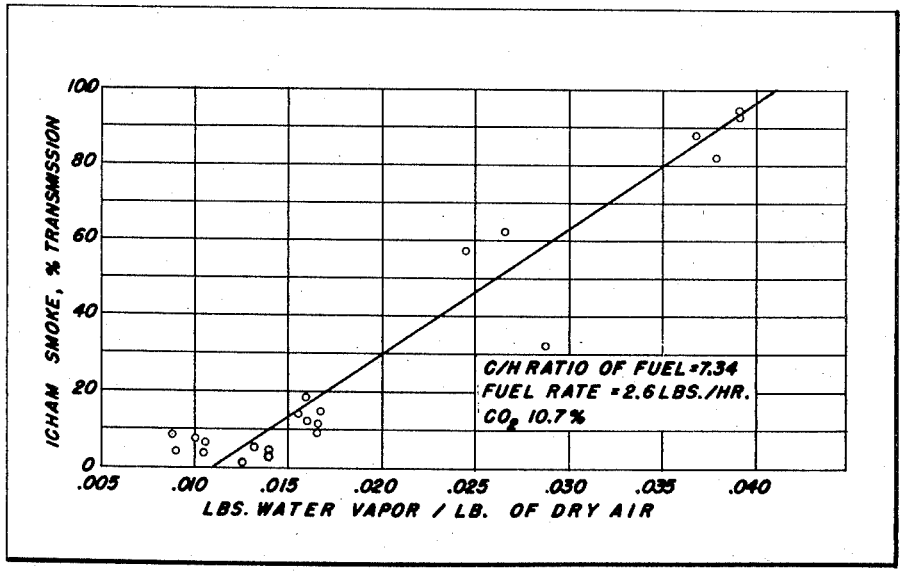

The graph of Figure 4 establishes that a fuel having a carbon to hydrogen ratio of 7.34 can be burned at a rate of 2.6 pounds per hour to a flue gas having 10.7 per cent carbon dioxide with an Icham smoke transmission of 60 to 100 per cent provided 0.029 to 0.041 pound of water vapor per pound of air or about 0.60 to 0.855 pound of water vapor per pound of fuel is present in the combustible vapors.

The curves of Figure 5 establish that at low rates of fuel consumption, i. e., 1 pound per hour, the presence of water in the combustible vapors has little effect upon the Icham smoke transmission below a rate of about 0.032 pound of water vapor per pound of air. On the other hand, at a rate of fuel consumption of 3.3 pounds per hour the effect of the presence of water vapor in the combustible vapors is evidenced at a rate of about 0.026 pound of water vapor per pound of air.

The data plotted in the curves of Figure 5 have been recalculated with the exception of that for curves L and K and plotted in Figure 6 to show the relation between Icham smoke per cent transmission and pounds of water per pound of fuel. These curves establish that for fuel rates of 2 to 3 pounds per hour a 60 to 100 per cent transmission in the Icham smoke test can be obtained when about 0.4 to about 0.85 pound of water vapor are present in the combustible vapors. Accordingly, the novel method of operating pot type vaporizing burners comprises burning the fuel in the presence of about 0.4 to about 0.85 pound of water vapor per pound of fuel for fuel rates of about 2 to 3 pounds per hour to produce flue gas containing about 9 to about 12 per cent carbon dioxide.

One modification of typical pot type vaporizing burner is illustrated in Figure 7. In Figure 7 an outer housing 1 having a plurality of feet 2 between which are air inflow spaces 3 is shown. A horizontal partition 4 having a more or less centrally located opening 5 partially closes the housing 1. The burner pot has a closed end 7 and is provided with an upper outwardly extending flange 8 which rests on an annular shelf 9. The upper portion 10 of housing 1 serves as a combustion chamber and means for radiating the heat so produced. The open end of pot 6 is partially closed with an annulus 11 which serves as a flame ring at high fuel rates while at low fuel rates ring 12 mounted in any suitable manner serves the same purpose. The pot is provided with a plurality of primary air inlets 13 in the wall 14. Liquid fuel is supplied to the pot from reservoir 15 through line 16. The rate of flow of the fuel is controlled in any suitable manner. Inlets for secondary air 17 are provided near the upper edge of wall 14 of the burner pot but below the level of annulus 11. Water vapor is introduced into the combustible vapors by generating steam at atmospheric pressure in boiler 18 and conducting the steam through pipe 19 to a point in the pot 6 near the fuel inlet 19. As illustrated, the boiler for introducing water vapor into the combustible vapors comprises a pot 18 electrically heated in a conventional manner by electric current passing through coil 20 surrounding the pot. The amount of current and hence the rate at which the water vapor is introduced into the combustible vapors is controlled by a variable resistance 21.

A modification of another commercially available pot type vaporizing burner whereby combustion of liquid fuel can be obtained in the presence of controlled amount of water vapor is illustrated in Figure 8. The burner comprises an outer housing or cabinet 21, a combustion chamber 22, a burner pot 23 provided with the conventional primary and secondary inlets, etc. (not shown) and a fuel inlet 24.

Within the combustion chamber and preferably located to be most efficiently heated by the heat of combustion of the fuel without interfering with the proper functioning of the burner is a suitably mounted steam generator 25. Water is fed to the generator 25 from an external water reservoir 26 likewise mounted in any suitable manner. The water passes from reservoir 26 to generator 25 through suitable piping 27 under the control of valve 28. The steam generated in 25 is introduced into the combustible vapors by pipe 29 terminating preferably at a point near the fuel inlet but above the surface of the pool of fuel in the bottom of pot 23.

The operation of pot type vaporizing burners with control of the amount of water vapor in the combustible vapors to provide a minimum of smoke, i. e., up to 100 per cent Icham transmission, is relatively simple. After setting the valve controlling the rate at which the fuel enters the burner pot the steam generator is regulated to produce an amount of steam sufficient to make the total amount of water vapor present in the combustible vapors about 0.4 to about 0.85 pound per pound of fuel. The water reservoir is then replenished at intervals or the reservoir may be connected with a general source of supply under control of a valve which keeps the amount of water in the reservoir practically constant.

I claim:

1. A method of burning liquid hydrocarbon fuel containing hydrocarbons from a hydrocarbon cracking operation in a pot type vaporizing burner which comprises establishing a confined pool of combustible liquid hydrocarbons containing hydrocarbons from a hydrocarbon cracking operation, continuing to supply said liquid hydrocarbons to said pool, igniting the hydrocarbons of said pool, and introducing steam into the combustible vapors so formed at a point slightly above the surface of said pool and at a rate of about 0.4 to about 1.0 pound of water per pound of fuel consumed.

2. A method of burning liquid hydrocarbon fuel containing hydrocarbons from a hydrocarbon cracking operation in a pot type vaporizing burner which comprises establishing a confined pool of combustible liquid hydrocarbons containing at least about 10 per cent liquid hydrocarbons obtained from a hydrocarbon cracking operation, continuing to supply said liquid hydrocarbons to said pool, igniting the hydrocarbons of said pool and introducing steam into the combustible vapors so formed at a point in the neighborhood of the point of introduction of said combustible liquid hydrocarbons into said pool and slightly above the surface of said pool, said steam being introduced into said combustible vapors at a rate of about 0.4 to about 1.0 pound of water per pound of fuel consumed.

3. A method of burning liquid hydrocarbons having a boiling range above that of gasoline and containing more than about 10 per cent of liquid hydrocarbons having a boiling range above that of gasoline and obtained from a hydrocarbon cracking operation which comprises establishing a confined pool of combustible liquid hydrocarbons having a boiling range above that of gasoline and containing more than about 10 per cent of liquid hydrocarbons obtained from a hydrocarbon cracking operation, continuing to supply said liquid hydrocarbons to said pool, said supplied liquid hydrocarbons containing more than 10 per cent of liquid hydrocarbons having a boiling range above that of gasoline and obtained from a hydrocarbon cracking operation, igniting the hydrocarbons of said pool and introducing steam into the combustible vapors so formed at a point slightly above the surface of said pool and at a rate of about 0.4 to about 1.0 pound of water per pound of fuel consumed.

4. In a pot type vaporizing burner comprising a burner pot constructed and arranged to confine a shallow pool of combustible hydrocarbons having a boiling range above that of gasoline, more than about 10 per cent of said combustible hydrocarbons being obtained from a hydrocarbon cracking operation, means for discharging and continuing to supply liquid combustible hydrocarbons containing more than about 10 per cent of hydrocarbons obtained from a hydrocarbon cracking operation on the floor of said burner pot to form said shallow pool, and a combustion chamber having primary and secondary air inlets in fluid connection with said burner pot, the improvement which comprises means for introducing steam into said burner pot at a point slightly above the surface of said pool, and means for regulating the flow of said steam to provide about 0.4 to about 1.0 pound of water vapor per pound of fuel consumed.

5. In a pot type vaporizing burner comprising a burner pot constructed and arranged to confine a shallow pool of combustible hydrocarbons having a boiling range above that of gasoline, more than about 10 per cent of said combustible hydrocarbons being obtained from a hydrocarbon cracking operation, means for discharging and continuing to supply liquid combustible hydrocarbons containing more than about 10 per cent of hydrocarbons obtained from a hydrocarbon cracking operation on the floor of said burner pot to form said shallow pool, and a combustion chamber having primary and secondary air inlets in fluid connection with said burner pot, the improvement which comprises means for introducing steam into said burner pot at a point slightly above the surface of said pool and in the neighborhood of said hydrocarbon discharge means, and means for regulating the flow of said steam to provide about 0.4 to about 1.0 pound of water vapor per pound of fuel consumed.

HENRY R. LINDEN.

REFERENCES CITED

The following references are of record in the file of this patent:

UNITED STATES PATENTS

| Number | Name | Date |
|---|---|---|
| 708,691 | Arper | Sept. 9, 1902 |
| 892,706 | Blubaugh | July 7, 1908 |
| 1,240,333 | Gardner | Sept. 18, 1917 |
| 1,499,734 | Heinzel | July 1, 1924 |
| 1,986,131 | Anderson | Jan. 1, 1935 |
| 2,375,598 | Trosky | May 8, 1945 |

FOREIGN PATENTS

| Number | Country | Date |
|---|---|---|
| 216,523 | Germany | Nov. 23, 1909 |